United States Patent
Ellis

(10) Patent No.: US 9,995,449 B2
(45) Date of Patent: *Jun. 12, 2018

(54) METHOD AND APPARATUS FOR ADHESIVELY ATTACHING A LIGHT COLLECTING REFLECTOR TO ENABLE A SOLAR LIGHT COMPRISING A BENDABLE STRAP AND A LIGHT CONVEYING MEANS

(71) Applicant: Jeremy Ellis, Norwalk, CA (US)

(72) Inventor: Jeremy Ellis, Norwalk, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 14/545,793

(22) Filed: Jun. 19, 2015

(65) Prior Publication Data
US 2016/0369960 A1  Dec. 22, 2016

(51) Int. Cl.
| | |
|---|---|
| *F21V 23/04* | (2006.01) |
| *F21S 9/03* | (2006.01) |
| *F21V 7/06* | (2006.01) |
| *F21V 8/00* | (2006.01) |
| *F21V 17/10* | (2006.01) |
| *F21V 17/16* | (2006.01) |
| *F21S 8/08* | (2006.01) |
| *F21W 131/10* | (2006.01) |

(52) U.S. Cl.
CPC ........... *F21S 9/037* (2013.01); *F21V 7/06* (2013.01); *F21V 17/101* (2013.01); *F21V 17/16* (2013.01); *F21V 23/0464* (2013.01); *G02B 6/0006* (2013.01); *F21S 8/08* (2013.01); *F21W 2131/10* (2013.01); *Y02B 20/72* (2013.01)

(58) Field of Classification Search
CPC ........ F21V 23/0464; F21V 7/06; F21S 9/037; F21S 19/005
USPC .......................... 250/203.4, 239, 214 R, 221
See application file for complete search history.

(56) References Cited

U.S. PATENT DOCUMENTS 4,476,853 A * 10/1984 Arbogast .............. F24D 11/003
  126/572
9,091,404 B2 * 7/2015 Ellis ........................ F21S 9/037

* cited by examiner

*Primary Examiner* — Que T Le
(74) *Attorney, Agent, or Firm* — I. Michael Bak-Boychuk

(57) ABSTRACT

A sheet metal stamped light collecting reflector assembly including a generally parabolic reflector at one end of a deformable strap which at its free end is adhesively secured to the peripheral edge of a photovoltaic solar array useful to charge a storage battery connected to power a light upon the sensing an ambient light below a predetermined level for collecting sufficient light emitted by a selected grid powered light source and reflecting same to supplement said ambient light to said predetermined light level.

6 Claims, 6 Drawing Sheets

METHOD AND APPARATUS FOR ADHESIVELY ATTACHING A LIGHT COLLECTING REFLECTOR TO ENABLE A SOLAR LIGHT COMPRISING A BENDABLE STRAP AND A LIGHT CONVEYING MEANS

REFERENCE TO RELATED APPLICATIONS

This application is a continuation-in-part of U.S. patent application Ser. No. 13/987,388 filed Jul. 19, 2013, which, in turn, obtains the benefit of the earlier filing date of U.S. Provisional Application 61/851,247 filed on Mar. 4, 2013.

STATEMENT CONCERNING GOVERNMENT INTEREST

None.

BACKGROUND OF THE INVENTION

Field of the Invention

The present invention relates to a method and apparatus for coordinating the operation of solar charged lighting devices in response to the timed sequencing of lighting systems powered by the electrical grid, and more particularly to directionally enabled light collectors useful in photocell switching of solar charged lighting devices focused on a selected grid powered light source.

Description of the Prior Art

In our current environment the use of solar lights is virtually universal, with little attention paid, however, to the over-all energy efficiencies that these very simple and trouble-free devices can provide. In its typical form the very simple solar charged light includes one or more photovoltaic cells connected to charge a battery which then powers a light when a photocell triggers a switch once the sun has set. Since both the charging and also the triggering cells respond to ambient lighting they are each typically embedded side-by-side in a single flat panel array with the various forms of this device exemplified in U.S. Pat. No. 6,799,716 to Kue-lbs; U.S. Pat. No. 5,570,000 to Kowalski; U.S. Pat. No. 5,101,329 to Doyle; U.S. Pat. No. 4,835,664 to Wen; and many others.

Since both the ambient light triggered switching device and also the light collecting charging array are best served by direct solar illumination these ubiquitous devices are typically deployed along the outer periphery of a residential property where they are most likely exposed to collect direct sunlight. Even in these peripheral locations, however, each such device is exposed to varying levels of sunlight exacerbated by varying levels of dust collection as well as varying intensities of reflected light and shading, resulting highly varied switching schedules as darkness begins to set in. Of course, these same variables also result in a wide range of battery charging rates and therefore the intervals of useful illumination that each solar light provides.

In consequence, the use of these solar lighting devices is typically only an adjunct to the grid powered outdoor lights that have illuminated our home entrances and rear decks as we each try to extended our active periods beyond those dictated by sunrise and sunset, an illumination system that is typically controlled by timers and the like to reduce the time intervals where solar charged lighting is needed at all. This grid powered illumination, however, is typically attached to the house structure itself, well inside the yard periphery with its lighting sources well outside the sensing angles of any surface mounted triggering photocell aligned towards the sun, thus precluding a coordinated switching response triggered by any of the grid powered lights.

Significantly, while the grid powered lighting sources are usually quite bright their individual lighting output is nonetheless far below the daylight collected by a switching photocell and a focused reflecting mechanism that inexpensively and effectively gathers a much larger portion of the light emitted by a single grid powered source and transmits this larger portion of its output directly to the photocell is therefore extensively required, and it is one such mechanism that is disclosed herein.

SUMMARY OF THE INVENTION

Accordingly, it is the general purpose and object of the present invention to provide an adjustably aligned focusing light reflector conformed for attachment to a solar light to extend a fiber optic bundle from its collecting focus to the switching photocell on the solar collection array.

A further object of the invention is to provide a generally parabolic light reflector deployable on or adjacent a solar light to align the reflective focus thereof to illuminate the switching photocell on the solar light collection array.

Other and yet further objects of the invention will become apparent upon the inspection of the description that follows in conjunction with the illustration appended.

Briefly, these and other objects are accomplished within the present invention by providing a generally parabolic light reflector of a substantially elliptical light collecting planform mounted on one end of a deformable wire structure that is clipped at its other end to the edge of a solar light cover on which the collecting array and its associated switching photocell are also deployed. In accordance with the first embodiment, one end of a fiber optic bundle is deployed at the light collecting focus of the reflector with the bundle then extending through or around the reflector where its other end is adhesively fixed adjacent the switching photocell aperture to be illuminated by the light from the adjacent bundle fiber ends. In this manner the light gathered in the much larger collection area of the reflector that is aligned to capture a selected grid powered light source is focused onto the switching photocell to coordinate the lighting cycle of the solar light when this grid light is turned off.

In its second form a generally parabolic reflector may be conformed into an eccentric, generally elliptical planform that is adjustably mounted on the end of a deformable wire post pushed into the ground adjacent its paired solar light bent or convolved to direct its diffused focal center onto the switching photocell when the reflector is once again aimed to capture the light emitted by a selected, adjacently located grid powered light source. While, of course, the preferred positioning of the reflectors in both implementations is behind the respective light collecting surfaces of the solar light to limit any incidence of unwanted shading, in order to render the alignment convenient the diffusion of the focal area of curvatures of both reflectors are distorted from the ideal parabolic curvatures, thereby diffusing the reflected focus into a larger volume both to simplify the orientation process and to reduce the potential of unintended damaging concentrated intensity levels of the reflected sunlight. Of course, in both the above forms the reflectors each need to be aligned behind the sunlight exposure of the collection array with their aiming axes generally aligned away from the solar light towards a selected grid powered light source.

It will be appreciated that both the foregoing inventive forms utilize the convenience of bending the supporting wire posts that are attached to the solar light or driven into the adjacent ground to effect the desired aiming and orienting of the light collecting reflective surface towards the grid powered light source. Once thus aligned the large amount of the reflected light aimed or fiber-optically guided onto the triggering photocell swamps the solar light's triggering operation in complementing coordination with the sequencing of the grid powered lights. Thus a much more orderly solar light operation is assured, reducing the illuminating cycle to the times when the grid powered illumination is off to extend battery life.

These same advantages can also be obtained in a more economical form by way of a single sheet metal stamping comprising the reflector dish attached at its periphery to one end of a bendable support strap that then terminates at its other end in a generally arcuate piece of a planform that is conformable to mate in contiguous contact with a portion of the tapered edge strip of the solar light assembly securable to the edge strip by a double sided adhesive strip. A pair of notched tabs respectively extending from the adhesively mounted strip and the peripheral edge of the reflector dish are then useful to fix the ends of the fiber optic bundle to align its ends in the diffused reflector focus and adjacent the triggering photocell to achieve the functions summarized above once the proper alignment is effected by bending the support strap.

In this manner a conveniently attachable, easily produced sheet metal stamping is devised which may be attached to a solar light assembly to extend its utility by integrating the lighting cycles thereof with those powered by an electrical grid.

DESCRIPTION OF THE PREFERRED EMBODIMENT

Figure 1:
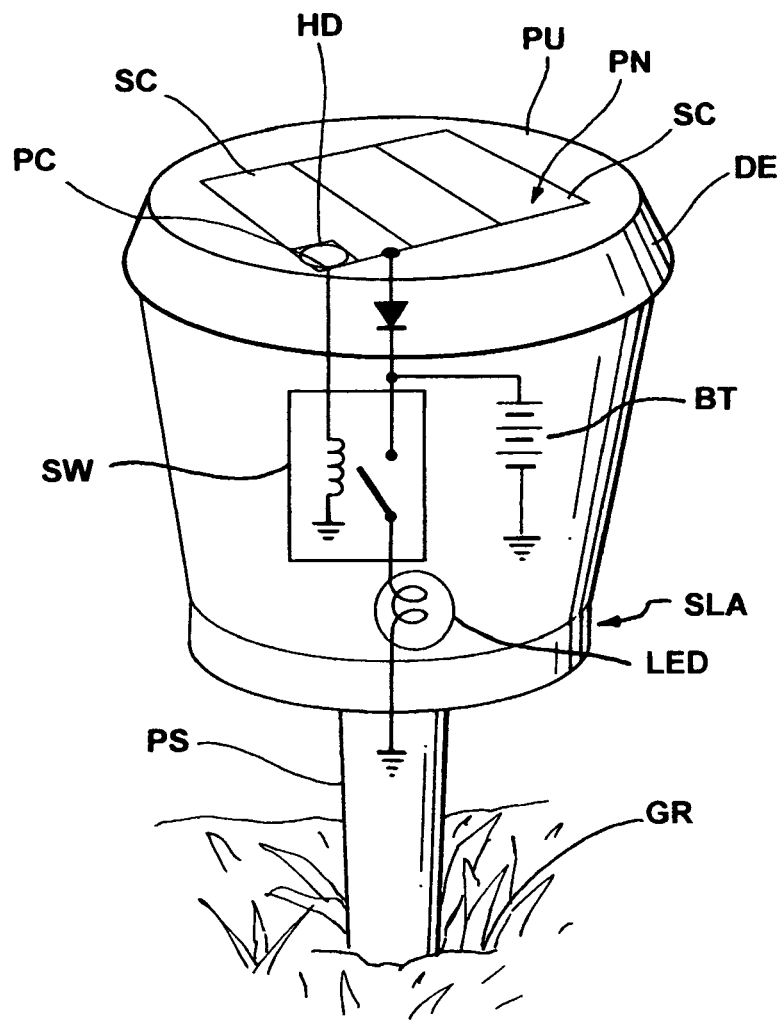
FIG. 1 is a diagrammatic illustration of a typical prior art solar light assembly illustrating the essential details thereof that are involved in its switching.
Figure 2:
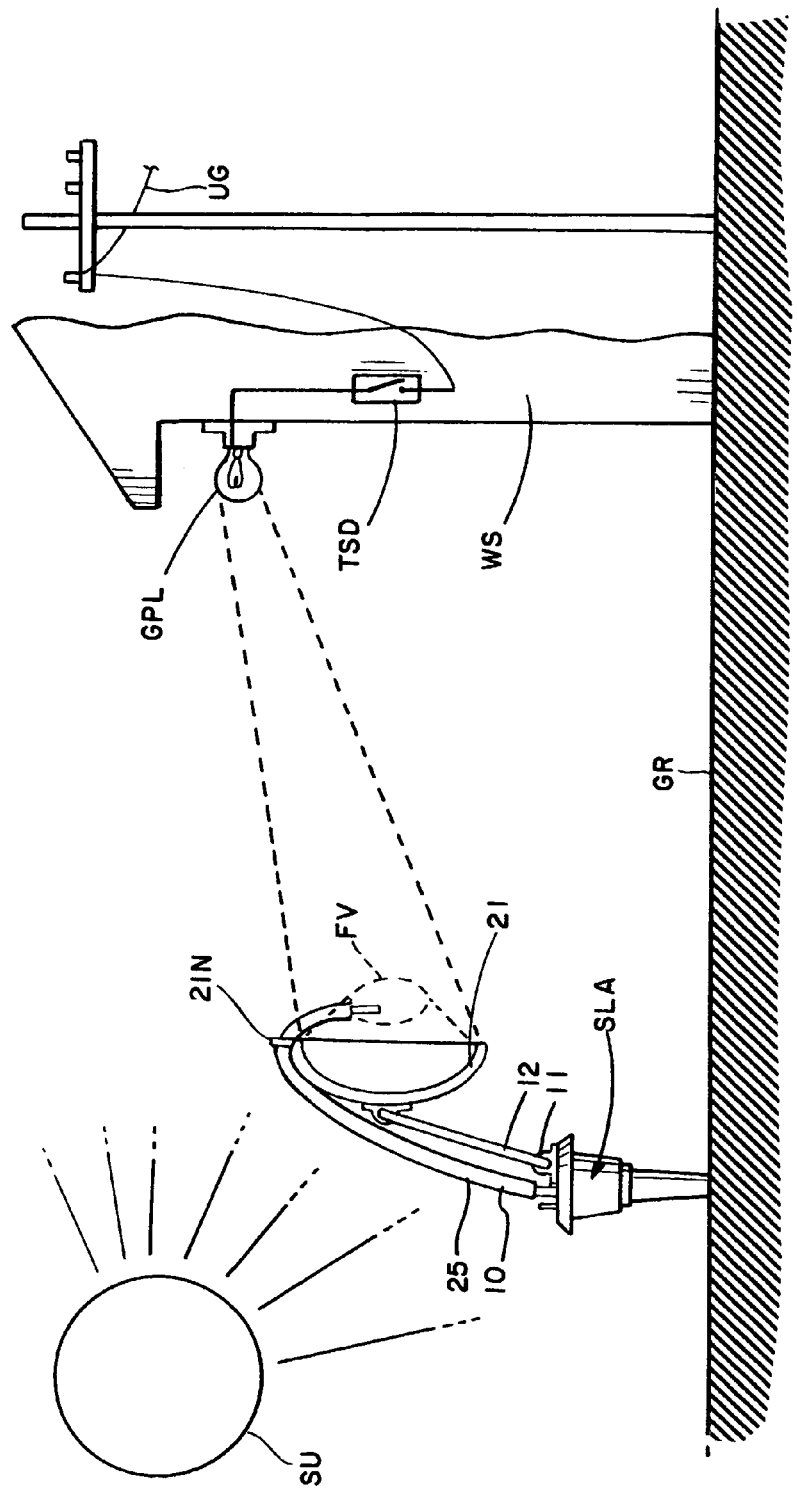
FIG. 2 is a diagrammatic illustration of the first embodiment of the inventive grid powered light collecting device useful to direct by way of fiber optics the collected light onto the triggering aperture of a typical solar light illustrated in FIG. 1.
Figure 3:
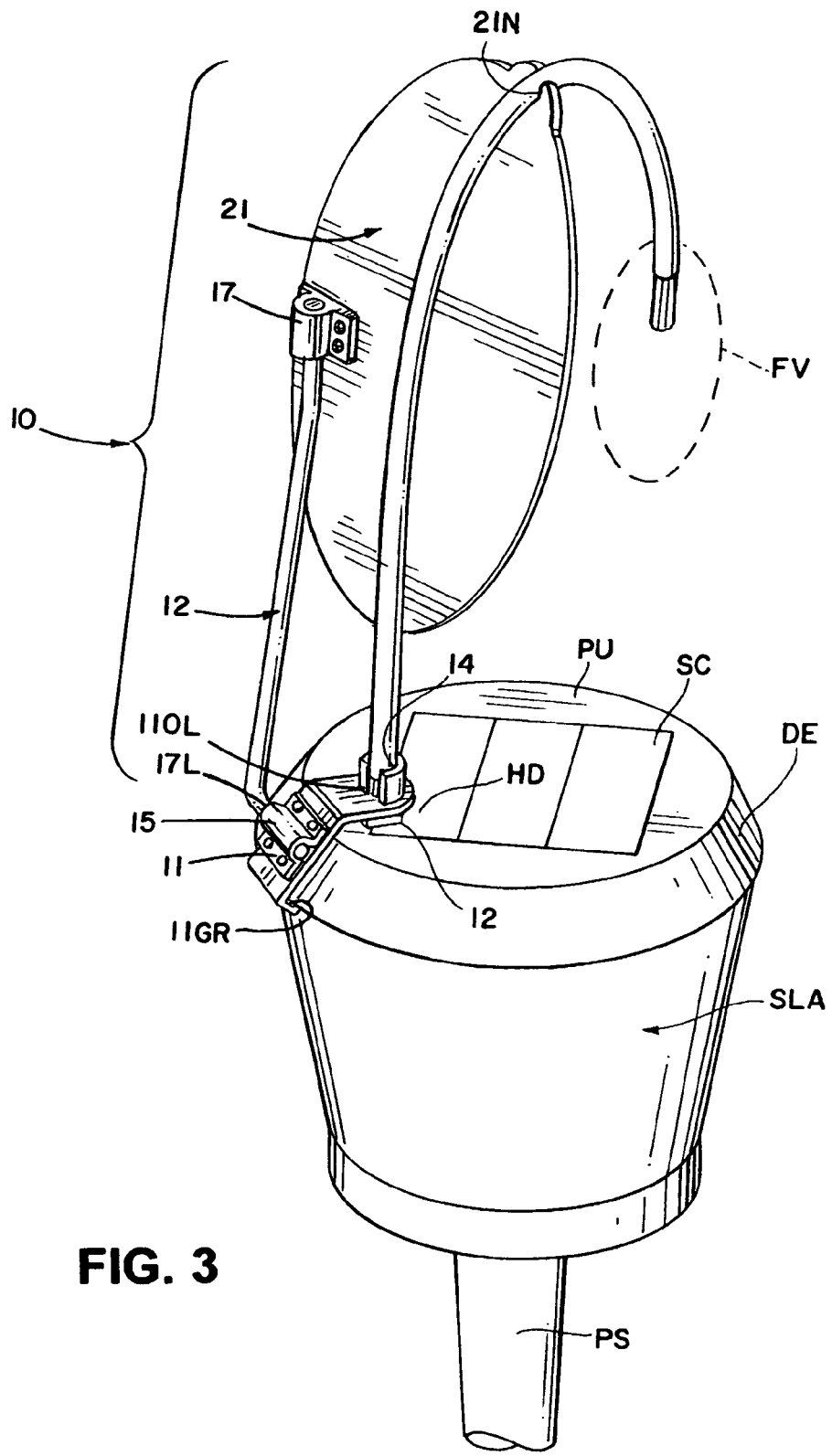
FIG. 3 is a perspective illustration of the inventive light collecting device illustrated in FIG. 1 depicting the fiber optic bundle to convey the light collected by reflection at one end of the bundle to the triggering aperture of the solar light in accordance with the first embodiment of the present invention shown in FIG. 2.
Figure 4:
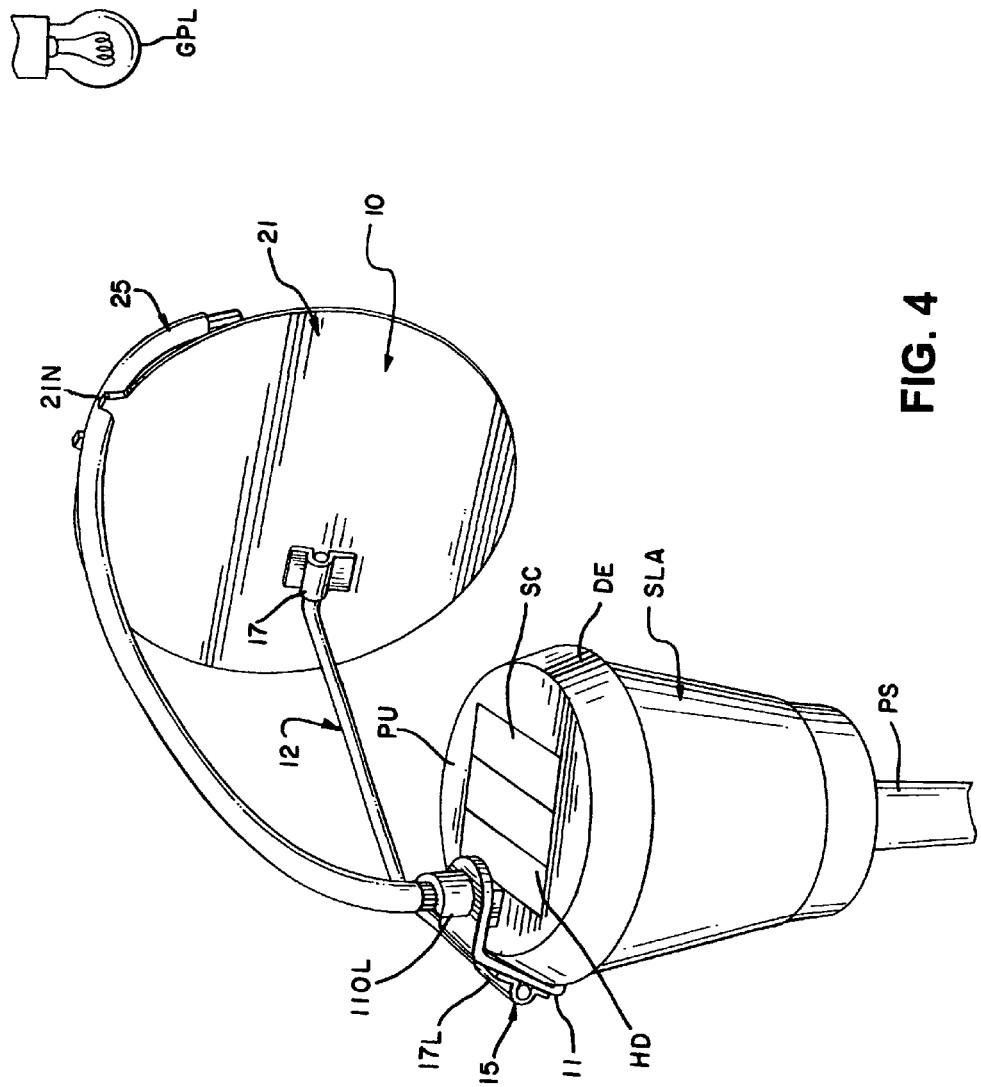
FIG. 4 is yet another diagrammatic illustration of a second embodiment of the inventive light collecting device deployed adjacent a solar light to reflect the collected light to the switching aperture thereof.

As shown in FIGS. 2 and 4 the inventive first embodiment of a light collecting device, generally designated by the numeral 10, is useful with, and is therefore generally associated with, a typical prior art solar light assembly SLA illustrated in FIG. 1 and characterized by an upper light collecting panel PU surrounded by a slanted peripheral drip edge DE and having a photovoltaic array PN mounted thereon on which one or more solar cells SC are positioned alongside a photocell PC connected to trigger a switch SW in circuit between a battery BT and a light emitting device LED. To replenish the power consumed in the course of lighting the solar cell(s) SC are also connected to the battery BT, with a blocking diode BD preventing reverse leakage. This whole solar light assembly is then mounted on a ground piercing spike PS that is pushed into the ground GR at selected locations.

A switch assembly SW in a circuit between the positive end of the battery BT and a low power light LED is opened by the signal from the photocell PC so that when the solar cells are exposed to sunlight to collect its energy, i.e., during daylight hours, to disconnect the light LED. Of course, since the continued operations of this assembly are all dependent on an efficient collection of sunlight the orientation of the panel PN is necessarily aligned for its full exposure thereto which nonetheless varies significantly as result of local shading, local absorption and/or local reflections from adjacent structures. Consequently, the instance when light LED of any singular solar light assembly SLA is turned on varies greatly, both because of the imprecisions in the triggering circuit itself and also because of the variations in the light intensity at the photocell PC which has been sometimes covered by a small, translucent hemispherical dome HD in an attempt to resolve this problem. Notwithstanding these attempted improvements the illumination starting times of these inexpensive solar lighting devices remain imprecise and are therefore difficult to coordinate effectively with any clock operated lighting arrangement that controls the lighting cycles of grid powered lights. This is particularly bothersome to those that want to use the solar energy stored in the solar lights as an adjunct lighting source once the grid lights are turned off.

In order to defer the lighting cycle of this typical solar lighting assembly SLA to a time when a complementing grid powered light GPL on the wall structure WS is turned off by a timed switching device TSD the first example of the inventive light collecting device 10 includes a generally U-shaped clip 11 conformed to engage the bottom periphery of the drip edge DE within a groove 11 GR along one of its legs with the other leg 110L then extending over the upper panel PU where it is fixed in spring pre-stress by a captured strip of adhesive 12 to align an opening 14 at its free edge over the photocell PC and its translucent covering HD. The center part of clip 11 is then provided with a transversely aligned bracket 15 which engages in frictional engagement the lateral arm 17L of an L-shaped rod 17 that is again frictionally captured between a vertical bracket 18 affixed to the rear exterior surface of a generally elliptical, parabolic reflector 21.

In this form the reflective alignment of the reflector 21 can be conveniently adjusted by the coordinated movement of the ends of rod 12 within brackets 15 and 17 and the concurrent rotation of the solar light assembly SLA around the insertion axis of its mounting post PS within the ground GR to obtain an alignment of the reflector that captures the light emitted by the grid powered light GPL. Once thus aligned the parabolic reflection focuses the reflected light into a focal volume FV in which one end of a fiber optic bundle 25 is extended from a generally cantilevered capture within a notch 21N with its other end of the bundle then received within the opening 14 to illuminate the photocell PC.

It will be appreciated that the foregoing arrangement obtains a substantial light amplification over the light originally admitted to the photocell PC, generally corresponding to the ratio of the relative areas of the reflector 21 and the photocell aperture. This same amplification also effectively amplifies the ambient background illumination by the sun SU to insure that the lighting of the solar light SLA is suppressed until substantial darkness sets in. In this manner the lighting cycle of the solar lights can be deferred until the timed grid powered cycle expires, conserving the energy stored in each solar light assembly.

By particular reference to FIG. 4 a second embodiment of the instant invention, generally designated by the numeral 110, includes a unitary reflector assembly 120 separately supported on its own mount comprising a length of deformable wire 112 that is inserted into the ground GR adjacent the solar light SLA. Like numbered parts functioning in a like manner to that previously described, an eccentric parabolic reflector 121 is affixed to the upper end of wire 112 and aligned to reflect the light emitted by the grid powered light GPL into a focal volume FV that is positioned to illuminate the upper panel PU including the photocell PH. To assure functional operation within the reflecting angles available reflector 121 is of a larger area than that of reflector 21 and its alignment is limited to areas where it does not interfere with the sunlight illumination of the solar light SLA. In this manner grid powered lights of various intensities may be easily accommodated in a passive arrangement that can be left unattended for long periods of time.

Figure 5:
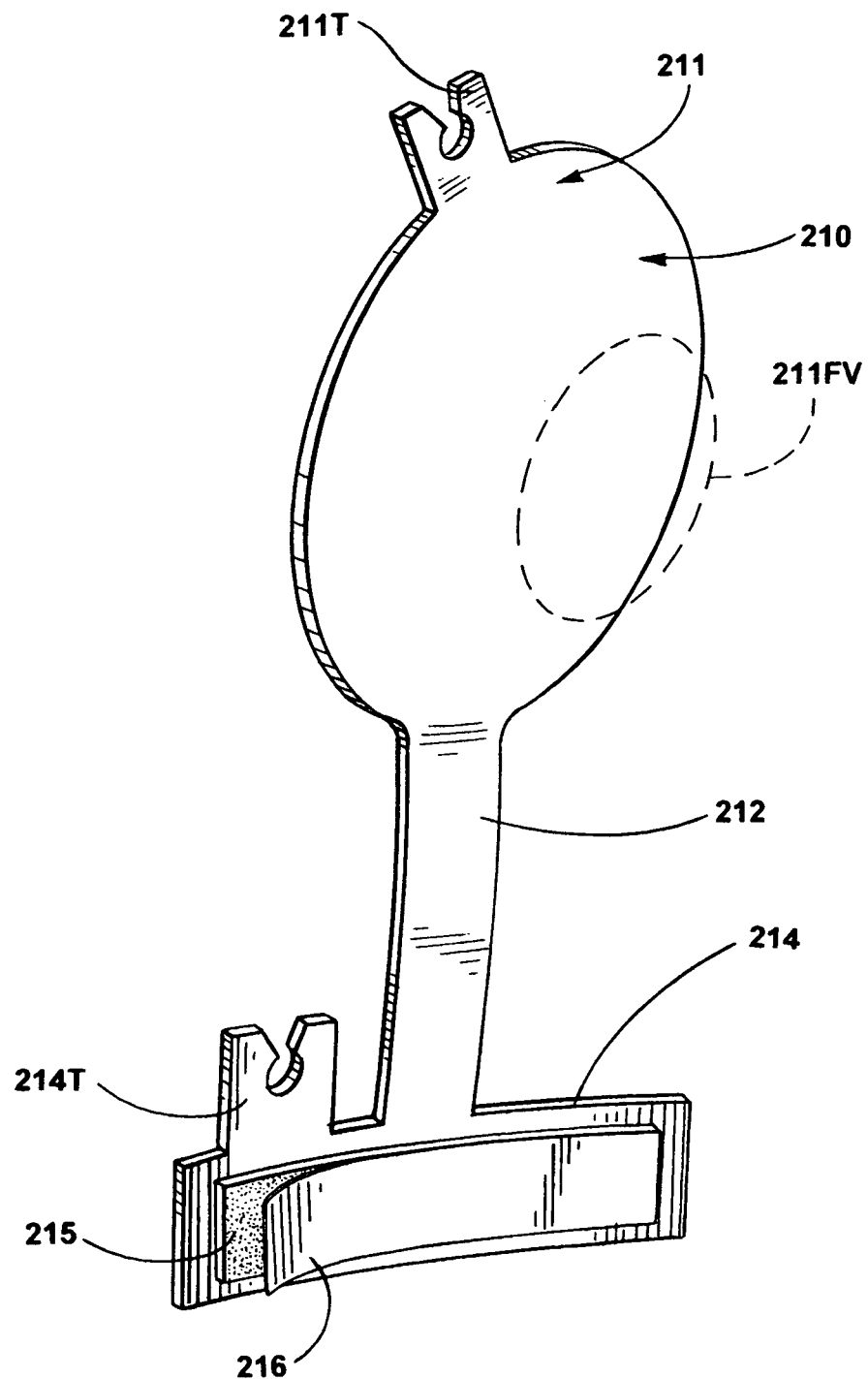
FIG. 5 is another perspective illustration of a yet further embodiment of the inventive light collecting device conformed as a unitary sheet metal stamping that is both convenient in its manufacture and is simply attached to a solar light assembly.
Figure 6:
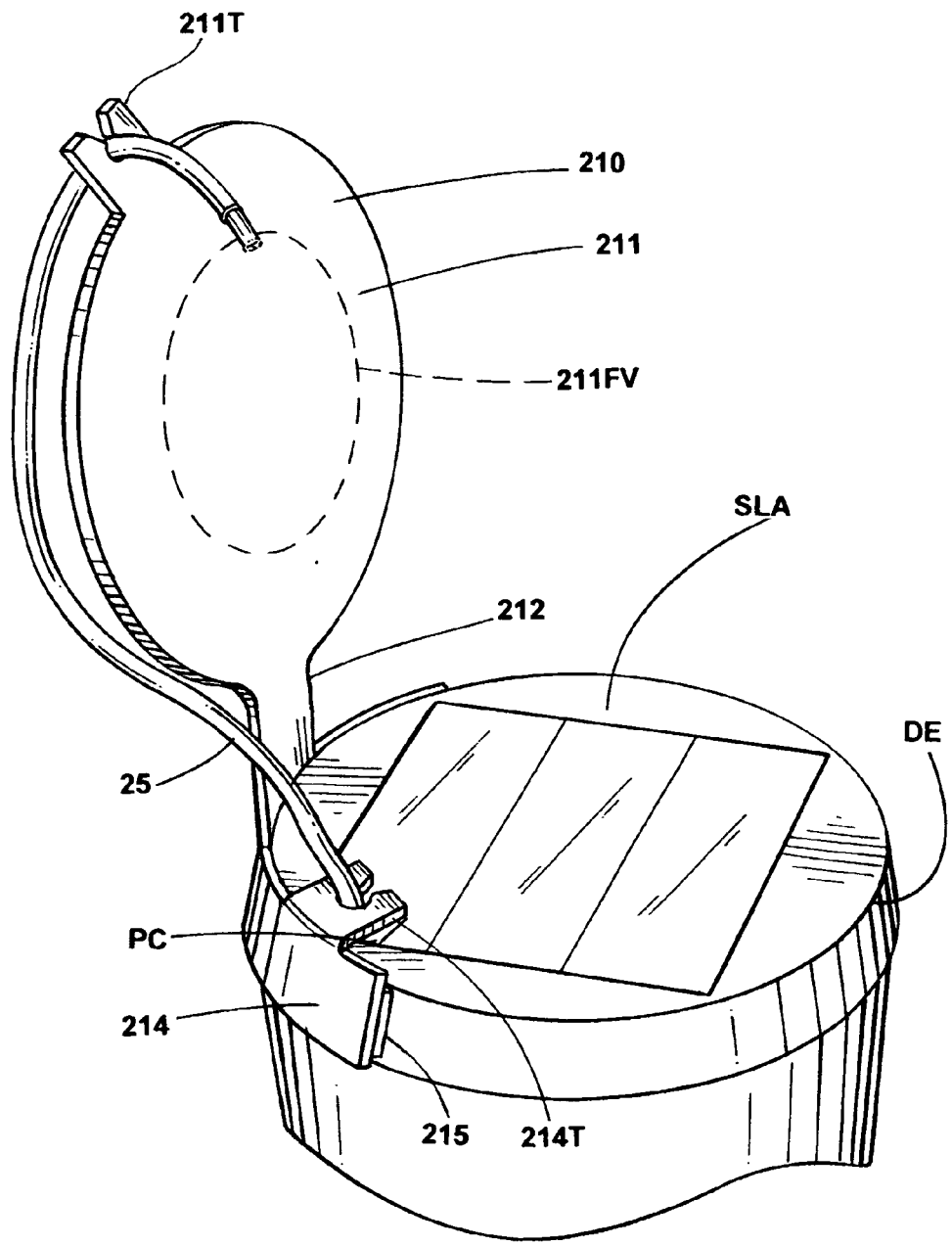
FIG. 6 is a perspective illustration of the inventive light collecting device embodied in FIG. 5 in its combined deployment with the conventional solar light assembly.

By particular reference to FIGS. 5 and 6 the foregoing advantages can be further implemented in an easily fabricated sheet metal stamping, illustrated in the embodiment generally designated by the numeral 210, in which a highly reflective metal sheet, like aluminum, is die stamped to form a single metal stamping comprising a dished parabolic reflector 211 connected at a portion of its periphery to one end of a support strap 212 that at its other end terminates in a generally arcuate enlargement 214 to which one side of a double faced adhesive strip 215 is adhered. A protective membrane 216 covering the exposed side of the adhesive strip 215 can then be selectively removed to facilitate the adhesive mounting of the enlargement 214 onto the drip edge DE of the solar light assembly SLA adjacent the triggering photocell PC.

Once again, like numbered parts functioning in a like manner as previously described, the foregoing adhesively mounted enlargement is further conformed so that the lower end of the fiber optic bundle 25 is captured in a slotted tab 214T on the peripheral edge of the enlargement 214 to align the bundle end adjacent the triggering photocell PC is triggered to its non-conductive state whenever the upper bundle end retained in a similarly slotted tab 211T on the reflector 211 periphery and aligned to extend into the reflector's focal volume 211FV is either illuminated by the reflected ambient light and/or the light from a grid powered light source. Of course, once both the fiber bundle ends are thus properly restrained the reflector may be easily aligned in elevation by bending strap 212 while also turning the solar light assembly SLA about its supporting insertion to achieve the desired directional alignment.

In this manner a simple metal stamping easily attached by adhesive tape conveniently coordinates various solar lights with the timer driven grid powered illumination, obtaining the maximal utility for the many solar lights that are currently left unused. Of course, while adhesive attachment to the solar light collecting edge of these lights is exemplified here those skilled in the art will appreciate that various other attachment locations and/or mounting arrangements of this very simple structure can be used.

Obviously many modifications and variations of the instant invention can be effected without departing from the spirit of the teachings herein. It is therefore intended that the scope of the invention be determined solely by the claims appended hereto.

It is claimed:

1. A light reflecting assembly useful with a solar light characterized by a photovoltaic light collecting panel connected to a storage battery and provided with a light sensing means connected to enable a switch rendered operative to connect a light to said storage battery upon sensing ambient light below a predetermined level, comprising:
   a stamped sheet metal combination including a generally parabolic reflector at one end of a bendable strap extending from the periphery of said reflector the other end of said strap being selectively securable to said solar light assembly, said reflector including a focus; and
   light conveying means connected between the focus of said reflector and said light sensing means.

2. Apparatus according to claim 1, wherein:
   said other end of said strap includes adhesive means for adhering to said light assembly.

3. Apparatus according to claim 2, wherein:
   said reflector and said strap each include a securing means for releasably securing said light conveying means thereto.

4. Apparatus according to claim 1, wherein:
   said light conveying means includes a fiber optic bundle having a first end securable by said securing means proximate said focus and a second end securable by said securing means proximate said sensing means.

5. Apparatus according to claim 3, wherein:
   said strap is selectively bendable for aligning said reflector relative said solar light assembly.

6. Apparatus according to claim 5, wherein:
   said reflector includes a peripheral edge including a recess for receiving a selected end of said light conveying means.

* * * * *